United States Patent [19]
Hayek et al.

[11] Patent Number: 5,630,094
[45] Date of Patent: May 13, 1997

[54] INTEGRATED BUS BRIDGE AND MEMORY CONTROLLER THAT ENABLES DATA STREAMING TO A SHARED MEMORY OF A COMPUTER SYSTEM USING SNOOP AHEAD TRANSACTIONS

[75] Inventors: George Hayek, Cameron Park, Calif.; Ali S. Oztaskin, Beaverton, Oreg.; Brian Langendorf, El Dorado Hills, Calif.; Bruce Young, Tigard, Oreg.

[73] Assignee: Intel Corporation, Santa Clara, Calif.

[21] Appl. No.: 375,972

[22] Filed: Jan. 20, 1995

[51] Int. Cl.⁶ .............................. G06F 13/00; G06F 13/40; G06F 3/00
[52] U.S. Cl. ............................. 395/473; 395/474; 395/494; 395/308; 395/309; 395/872
[58] Field of Search .................................. 395/473, 474, 395/494, 306, 308, 309, 872, 464, 468

[56] References Cited

U.S. PATENT DOCUMENTS

| | | | |
|---|---|---|---|
| 5,072,369 | 12/1991 | Theus et al. | 395/473 |
| 5,195,089 | 3/1993 | Sindhu et al. | 370/85.1 |
| 5,317,718 | 5/1994 | Jouppi | 395/464 |
| 5,325,503 | 6/1994 | Stevens et al. | 395/473 |
| 5,335,335 | 8/1994 | Jackson et al. | 395/473 |
| 5,341,487 | 8/1994 | Derwin et al. | 395/473 |
| 5,353,415 | 10/1994 | Wolford et al. | 395/306 |
| 5,355,467 | 10/1994 | MacWilliams et al. | 395/473 |
| 5,379,384 | 1/1995 | Solomon | 395/308 |
| 5,420,991 | 5/1995 | Konigsfeld et al. | 395/375 |
| 5,499,355 | 3/1996 | Krishnamohan et al. | 395/464 |

FOREIGN PATENT DOCUMENTS 6-37768  2/1994  Japan.

*Primary Examiner*—Glenn Gossage
*Attorney, Agent, or Firm*—Blakely, Sokoloff, Taylor & Zafman

[57] ABSTRACT

A computer system having an integrated bus bridge and memory controller circuit and method for enabling access to a shared memory with high bandwidth data streaming are disclosed. The integrated bus bridge and memory controller circuit performs a series of snoop ahead transactions over a first bus during access transactions to the shared memory that originate over a second bus and thereby enables high bandwidth data streaming on the second bus. The integrated bus bridge and memory controller circuit includes a peripheral write buffer that buffers write data received over the second bus and that stores a snoop done flag for the write data that indicates whether a corresponding snoop ahead transaction for the write data is complete. The integrated bus bridge and memory controller circuit further includes a peripheral read prefetch buffer that prefetches read data during read transactions over the second bus only after a corresponding snoop ahead transaction for the read data is complete.

8 Claims, 5 Drawing Sheets

INTEGRATED BUS BRIDGE AND MEMORY CONTROLLER THAT ENABLES DATA STREAMING TO A SHARED MEMORY OF A COMPUTER SYSTEM USING SNOOP AHEAD TRANSACTIONS

BACKGROUND OF THE INVENTION

1. Field of the Invention

The present invention pertains to the field of computer systems. More particularly, this invention relates to an integrated bus bridge and memory controller that enables data streaming to a shared memory resource while maintaining cache coherency.

2. Background

Prior computer systems commonly include a main processor or host processor that communicates with other elements of the computer system via a processor or host bus. Other elements coupled to such a processor or host bus typically include one or more cache memories as well as a main memory for the computer system. Such a main memory is typically comprised of dynamic random access memories (DRAM).

Prior computer systems may also include one or more peripheral buses that enable communication among a variety of peripheral components. Such a computer system may also include bridge circuits that enable communication between the processor or host bus and the peripheral buses. Such a bridge circuit typically enables communication between the main or host processor and the various bus agents coupled to the peripheral bus.

In addition, the bus agents coupled to such a peripheral bus may require access to the main memory of the computer system. In such a system, the data stored in the main memory may be modified either by the main processor or host processor or other elements coupled to the processor bus as well as various bus agents coupled to the peripheral buses.

In some prior computer systems, such peripheral buses usually enable extremely high speed or high bandwidth communication. For example, the peripheral component interconnect (PCI) published bus specification allows data communication bandwidth of up to 133 megabytes per second. Unfortunately, prior computer systems typically limit the available bandwidth on such a peripheral bus well below the maximum allowable provided by the published standard.

Typically, the bandwidth on such a peripheral bus is limited by the cache coherency transactions that occur on the host or processor bus during memory access transactions that initiate from the peripheral bus. For example, one prior computer system employs an integrated bridge and memory controller circuit that functions as a bus bridge between the host or processor bus and a peripheral bus while at the same time functioning as a memory controller for the main memory of the computer system. Such a system typically limits each atomic data transfer transaction on the peripheral bus targeted for the main memory to a single data line or cache line.

For example, in such a system, during a memory write transaction that originates on the peripheral bus, a prior integrated bridge and memory controller usually receives a data line over the peripheral bus and generates a corresponding snoop request over the processor bus. After the appropriate line invalidate or write back transaction on the host or processor bus, the integrated bridge and memory controller then transfers the data line to the main memory. Unfortunately, such a bridge and memory controller usually cannot immediately accept a subsequent line of data over the peripheral bus during a data streaming transaction. Instead, such an integrated bridge and memory controller usually signals an end to the write transaction on the peripheral bus. Thereafter, the initiating bus agent on the peripheral bus typically initiates another write transaction to transfer the next data line to the main memory.

Such a system that limits atomic transfers to a single data line ensures that the integrated bridge and memory controller obtains a data line address from the originating bus agent on the peripheral bus for each data line transfer to the main memory. The integrated bridge and memory controller typically uses the address for each data line to initiate a snoop request over the processor or host bus. A memory controller could generate addresses for each data line transferred over the peripheral bus in order to provide the proper snoop request transactions on the processor bus. However, such address generation logic typically increases the complexity and cost of such a memory controller and drives up the overall system cost.

SUMMARY OF THE INVENTION

An integrated bus bridge and memory controller circuit is disclosed that enables access to a shared memory with high bandwidth data streaming. The circuit enables access to the shared memory over a processor bus and over a high bandwidth peripheral bus. The circuit performs a series of snoop ahead transactions over the processor bus during data streaming transactions to the shared memory that originate over the peripheral bus.

Other features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
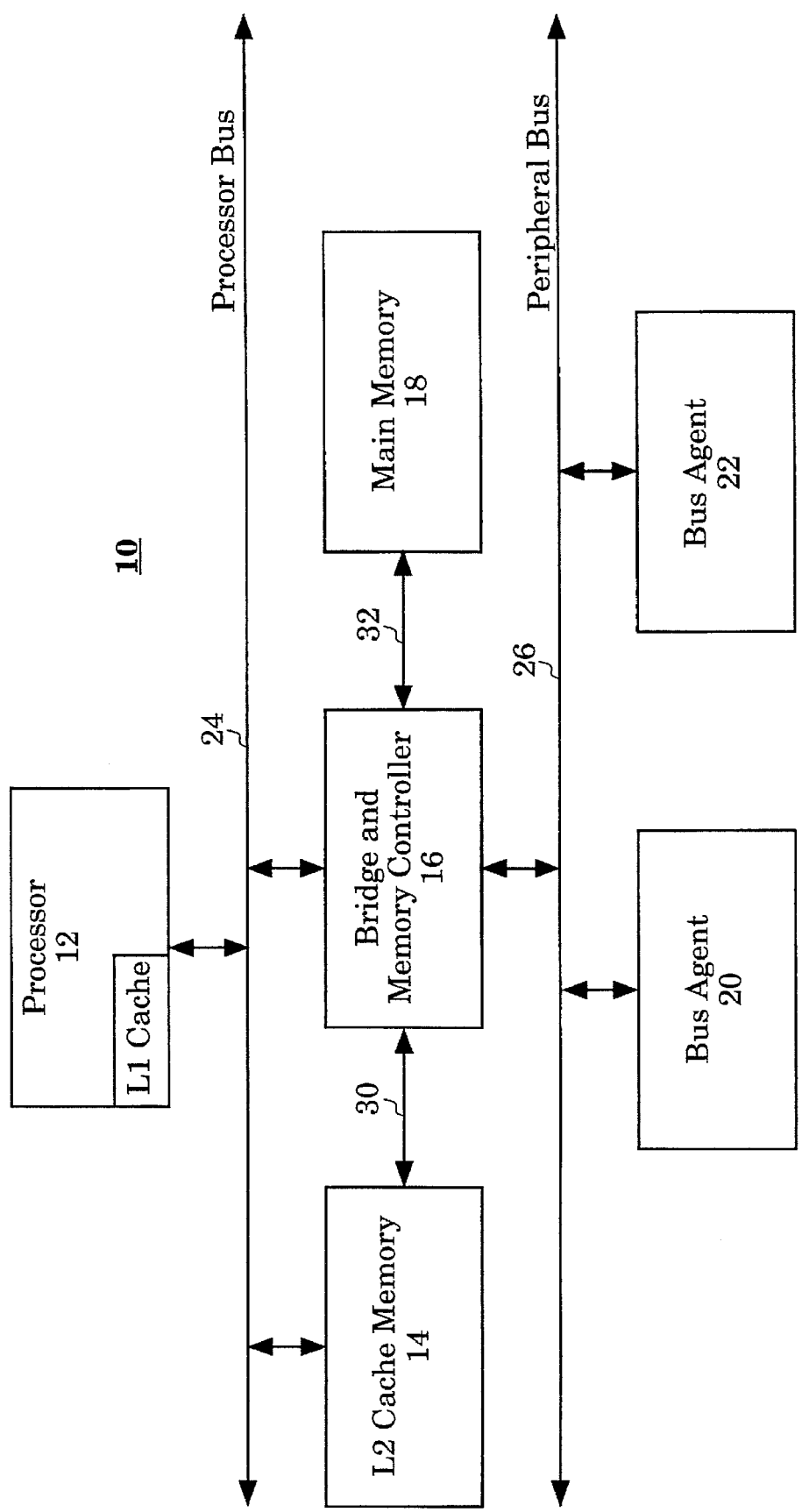
FIG. 1 illustrates a computer system which comprises a processor, a cache memory, a main memory, and a bridge and memory controller circuit.

FIG. 1 illustrates a computer system 10. The computer system 10 comprises a processor 12, a cache memory 14, a main memory 18, and a bridge and memory controller 16. In addition, the processor 12 contains an internal level one (L1) cache memory.

The processor 12 is coupled for communication over a processor bus 24. The cache memory 14 is also coupled to the processor bus 24 and functions as a level two (L2) cache memory for the processor 12. The main memory 18 is comprised of dynamic random access memory (DRAM) and functions as the main memory storage for the computer system 10.

The bridge and memory controller 16 functions as a memory controller for the main memory 18. In addition, the bridge and memory controller 16 functions as a cache controller for the cache memory 14. The bridge and memory controller 16 enables read and write access to the main memory 18 from the processor bus 24 as well as a peripheral bus 26.

The bridge and memory controller 16 also functions as a bus bridge between the processor bus 24 and the peripheral bus 26. The bridge and memory controller 16 enables transactions originating on the processor bus 24 to propagate to the peripheral bus 26. In addition, the bridge and memory controller 16 enables transactions originating on the peripheral bus 26 from one of a set of bus agents 20 and 22 to propagate to the processor bus 24.

The bridge and memory controller 16 also enables the bus agents 20 and 22 to access data stored in the main memory 18 across bus 32. The bridge and memory controller 16 coordinates accesses to the main memory 18 that originate on the peripheral bus 26 with accesses to the main memory 18 that originate on the processor bus 24. In addition, the bridge and memory controller 16 initiates snoop request transactions on the processor bus 24 during memory accesses to the main memory 18 from the peripheral bus 26 in order to maintain cache coherency among the caches coupled to the processor bus 24. The caches coupled to the processor bus 24 include the internal L1 cache in the processor 12 along with the L2 cache memory 14 which is also coupled to bridge and memory controller 16 across bus 30.

Figure 2:
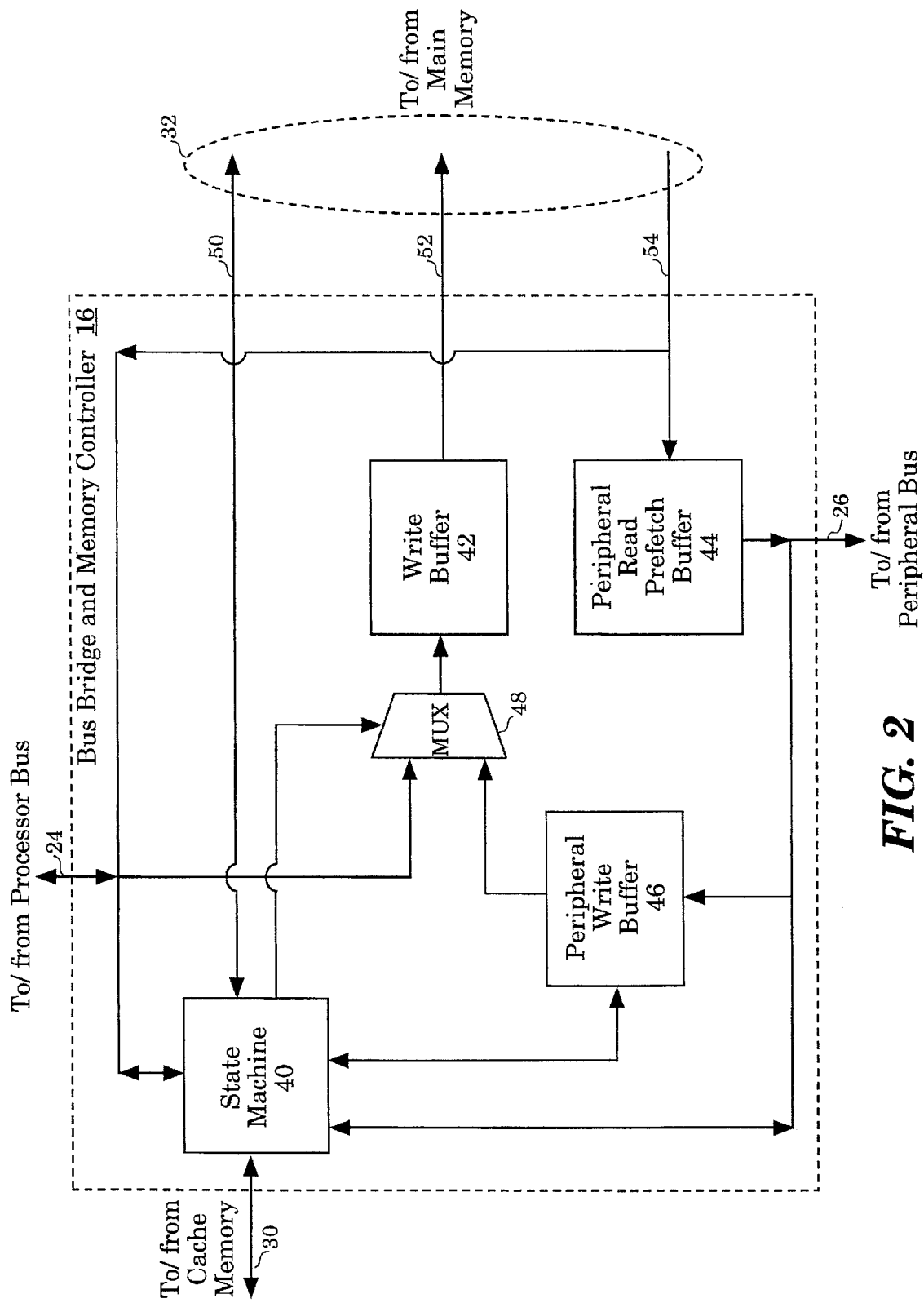
FIG. 2 illustrates the bridge and memory controller of the computer system of FIG. 1 that includes a write buffer, a peripheral read prefetch buffer, and a peripheral write buffer along with a state machine that controls snoop ahead transactions.

FIG. 2 illustrates the bridge and memory controller 16. The bridge and memory controller 16 includes a write buffer 42, a peripheral read prefetch buffer 44, and a peripheral write buffer 46. In addition, the bridge and memory controller 16 includes a state machine 40 that coordinates data transfers between the main memory 18 and the bus agents 20 and 22 via the peripheral bus 26, and that initiates snoop request transactions to the cache memories on the processor bus 24.

The write buffer 42 buffers write data targeted for the main memory 18 that originates from agents coupled to the processor bus 24 and agents coupled to the peripheral bus 26. A multiplexer 48 controlled by the state machine 40 selects either a data path from the processor bus 24 or a data path from the peripheral bus 26. The write buffer 42 compensates for the latency of DRAM accesses via a DRAM write path 52 in comparison to the speed of data transfer via the processor bus 24 or the peripheral bus 26.

The peripheral write buffer 46 buffers write data targeted for the main memory 18 that originates from bus agents on the peripheral bus 26. The peripheral write buffer 46 stores write data along with flags that are maintained by the state machine 40. The flags maintained by the state machine 40 indicate whether the data stored in the peripheral write buffer 46 corresponds to data lines having a completed snoop request transaction over the processor bus 24. The state machine 40 merges the data from the peripheral write buffer 46 into the write buffer 42 through the multiplexer 48 only after the corresponding snoop request transaction for the data line is complete over the processor bus 24.

The peripheral read prefetch buffer 44 prefetches sequential data lines from the main memory 18 in preparation for read transactions on the peripheral bus 26. The state machine 40 controls prefetches into the peripheral read prefetch buffer 44 to ensure that a read to the main memory 18 via a read path 54 does not occur until after the snoop transaction for the corresponding data line is completed via the processor bus 24.

Figure 3:
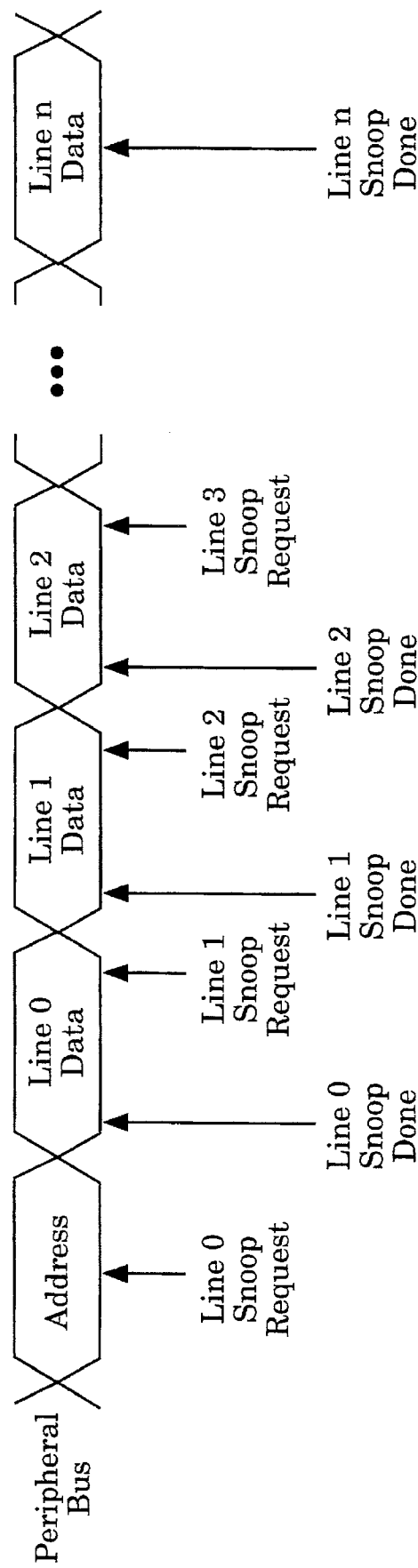
FIG. 3 illustrates a write transaction targeted for the main memory that originates over the peripheral bus wherein the write transaction comprises an address phase followed by a series of data phases of line 0 data line through line n data.

FIG. 3 illustrates a write transaction targeted for the main memory 18 that originates over the peripheral bus 26. As shown, the write transaction comprises an address phase followed by a series of data phases comprising line 0 data through line n data. During the address phase, the peripheral bus 26 carries the address of data line 0 for the write transaction. Subsequently, the phases for the line 0 data through line n data each transfer an amount of data via the peripheral bus 26 equal to a cache line in the cache memory 14 or the internal cache of the processor 12.

To enable high bandwidth write transactions to the main memory 18 from the peripheral bus 26, the state machine 40 performs a snoop ahead transaction for each data line in the write transaction. For example, during the address phase of the write transaction on the peripheral bus 26, the state machine 40 issues a line 0 snoop request over the processor bus 24. Thereafter, the cache memory 14 and the internal cache of the processor 12 each perform either a writeback operation, also known as a copyback transaction, or an internal invalidate cache line operation depending upon the clean or dirty status of the cache line specified by the line 0 snoop request.

Thereafter, during the line 0 data phase of the write transaction on the peripheral bus 26, the line 0 snoop transaction on the processor bus 24 completes. As a consequence, the line 0 data buffered in the peripheral write buffer 46 is marked by the state machine 40 with a snoop done (SD) flag. Initially, the state machine 40 stores a snoop not done (SND) flag for the line 0 data contained in the peripheral write buffer 46 prior to the completion of the line 0 snoop request on the processor bus 24.

Later during the line 0 data phase, the state machine 40 generates a next sequential address corresponding to the line 1 data. Thereafter, the state machine 40 issues a line 1 snoop request over the processor bus 24. As shown, the state machine 40 continuously issues snoop request transactions over the processor bus 24 prior to the reception of the corresponding data line over the peripheral bus 26 during the write transaction. The snoop ahead transactions issued by the state machine 40 prevent the occurrence of wait cycles or delay cycles on the peripheral bus 26 during write transactions targeted for the main memory 18 through the peripheral write buffer 46.

Figure 4:
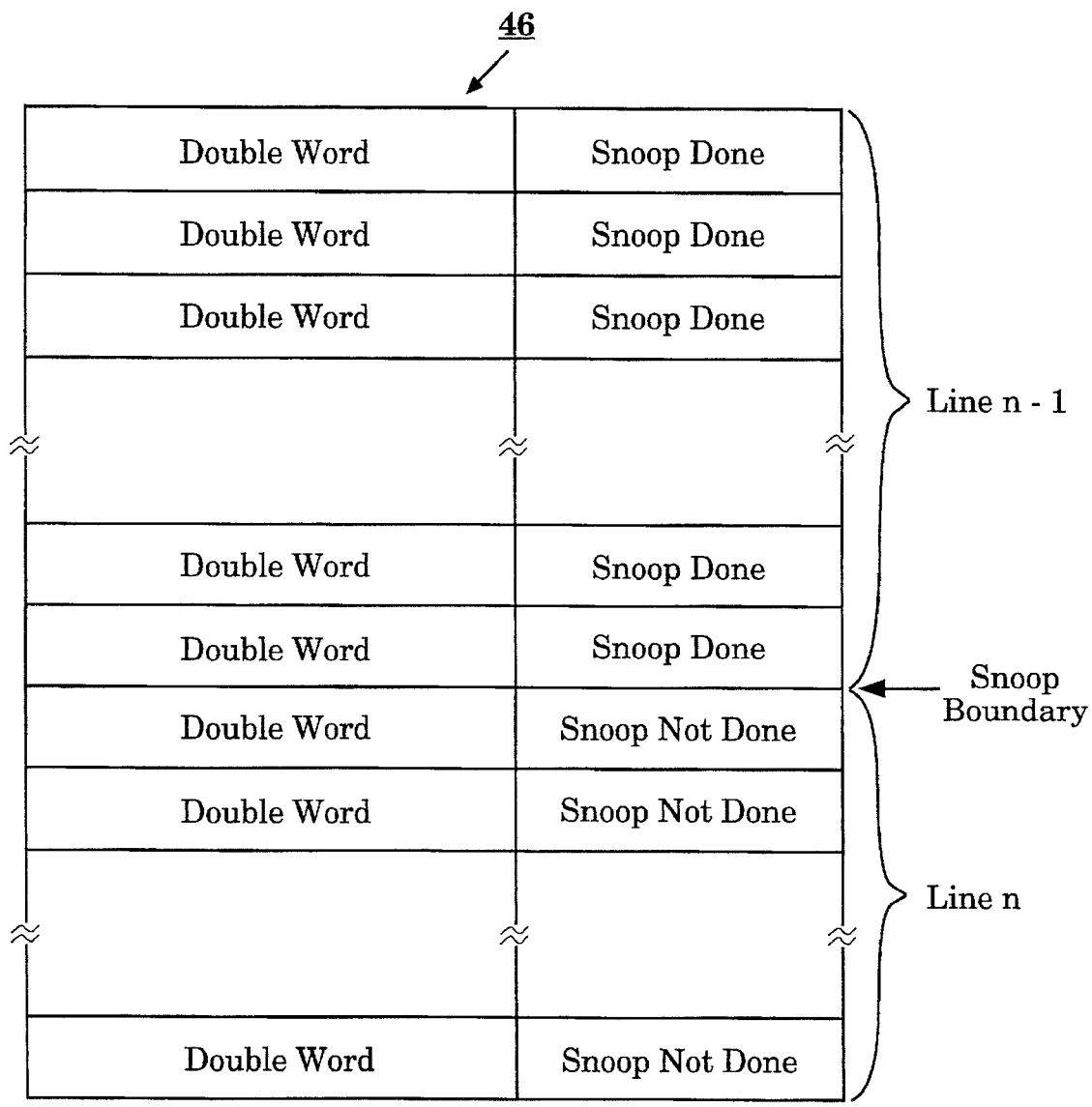
FIG. 4 illustrates the format of data stored in the peripheral write buffer including a set of double word data values each with a corresponding snoop status flag.

FIG. 4 illustrates the format of data stored in the peripheral write buffer 46 for one embodiment. The peripheral write buffer 46 stores a set of double word data values each with a corresponding snoop status flag. The snoop status flag indicates either snoop done (SD) or snoop not done (SND) depending upon the status of the corresponding snoop ahead request issued by the state machine 40 over the processor bus 24. The boundary in the peripheral write buffer 46 between data having an SD indication and data having an SND indication provides a snoop boundary between line n-1 and line n. The state machine 40 merges the data from the peripheral write buffer 46 into the write buffer 42 only if the corresponding snoop status flag indicates snoop done.

Figure 5:
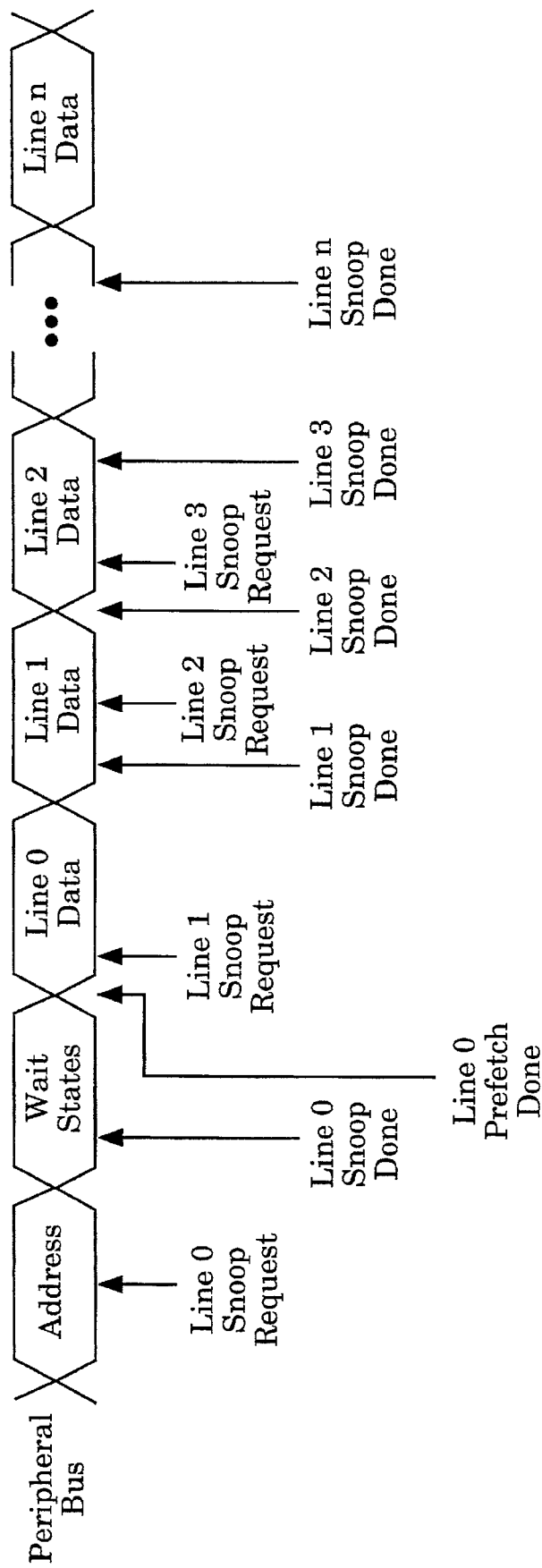
FIG. 5 illustrates a read transaction from the main memory over the peripheral bus wherein the read transaction comprises an address phase, and a set of wait states, followed by a set of data phases comprising line 0 data line through line n data.

FIG. 5 illustrates a read transaction from the main memory 18 over the peripheral bus 26. The read transaction on the peripheral bus 26 comprises an address phase, and a set of wait states, followed by a set of data phases comprising line 0 data through line n data. During the address phase of a read transaction, the originating bus agent on the peripheral bus 26 transfers the address of the initial data line being read from the main memory 18. As shown during the address phase, the state machine 40 issues a line 0 snoop request over the processor bus 24 that specifies the data line address provided during the address phase.

During the wait states on the peripheral bus 26, the line 0 snoop transaction on the processor bus 24 completes. Thereafter, a DRAM latency occurs while the peripheral read prefetch buffer 44 receives the corresponding data line from the main memory 18 via the read path 54. The line 0 prefetch to the peripheral read prefetch buffer 44 completes before the start of the line 0 data phase on the peripheral bus 26.

During the line 0 data phase on the peripheral bus 26, the peripheral read prefetch buffer 44 transfers the buffered read data over the peripheral bus 26 while the state machine 40 issues a line 1 snoop request over the processor bus 24 using an address generated as a next sequential cache line address from the address specified during the preceding address phase. Later in the line 0 data phase of the read transaction on the peripheral bus 26, the line 1 snoop transaction on the processor bus 24 completes. The completion of the line 1 snoop request enables a prefetch of the corresponding data line from the main memory 18 into the peripheral read prefetch buffer 44. Thereafter, the line 1 data from the peripheral read prefetch buffer 44 is transferred over the peripheral bus 26.

In addition, the state machine 40 monitors the occurrence of wait states on the peripheral bus 26 during read and write transactions. The state machine 40 counts the number of wait states that occur on the peripheral bus 26. The state machine 40 implements a disconnect time-out mechanism such that a disconnect is signaled over the peripheral bus 26 if the number of consecutive wait states on the peripheral bus 26 exceeds eight. The eight wait states conforms to the peripheral component interface (PCI) specification for maximum latency during data transfers. The disconnect indication on the peripheral bus 26 causes the bus agent that initiated the read transaction or the write transaction to terminate the transaction and try again later.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A computer system, comprising:

a processor and a cache memory each coupled to a first bus;

a main memory;

a bus agent coupled to a second bus; and a bus bridge and memory controller circuit coupled to the first bus and the second bus, the bus bridge and memory controller circuit enabling read and write access to the main memory from the first bus and the second bus and also including buffer circuitry for buffering write data, received over the second bus and targeted for the main memory, the bus bridge and memory controller circuit initiating and performing a plurality of snoop ahead transactions to the cache memory over the first bus during memory access transactions originated on the second bus and targeted for the main memory, the bus bridge and memory controller circuit including circuitry for storing, for each of the plurality of snoop ahead transactions, a snoop status indication for indicating if a respective one of the plurality of snoop ahead transactions corresponding to a respective one of the memory access transitions has completed.

2. The computer system of claim 1, wherein the buffer circuitry includes a write buffer, coupled to the main memory, for buffering write data targeted for the main memory, the bus bridge and memory controller circuit including circuitry for memory write data received over the first bus with write data received over the second bus.

3. The computer system of claim 2, wherein the buffer circuitry includes a peripheral write buffer, coupled to the circuitry for merging, for buffering write data received over the second bus.

4. The computer system of claim 2, wherein the buffer circuitry includes a peripheral read prefetch buffer, coupled to the second bus, for prefetching read data from the main memory corresponding to the memory access transactions originated on the second bus only after a corresponding one of the plurality of snoop ahead transactions for the read data is complete as indicated by the respective snoop status indication.

5. A bus bridge and memory controller circuit for use in a computer system having a processor and cache memory, each coupled to a first bus, and a bus agent coupled to a second bus, the bus bridge and memory controller circuit coupled to the first bus and the second bus, the computer system further including a main memory coupled to the bus bridge and memory controller circuit, the bus bridge and memory controller circuit comprising:

state machine circuitry for enabling read and write access to the main memory from the first bus and the second bus and for initiating and performing a plurality of snoop ahead transactions to the cache memory over the first bus during memory access transactions originated over the second bus and targeted for the main memory;

buffer circuitry for buffering write data received over the second bus and targeted for the main memory; and circuitry for storing, for each of the plurality of snoop ahead transactions, a snoop status indication for indicating if a respective one of the plurality of snoop ahead transactions corresponding to a respective one of the memory access transactions has completed.

6. The bus bridge and memory controller circuit of claim 5, wherein the buffer circuitry includes a peripheral read prefetch buffer coupled to the second bus, the peripheral read prefetch buffer prefetching read data from the main memory corresponding to the memory access transactions originated on the second bus only after a corresponding one of the plurality of snoop ahead transactions for the read data is complete as indicated by the respective snoop status indication.

7. The bus bridge and memory controller circuit of claim 5, wherein the state machine circuitry is coupled to the buffer circuitry to control the merging of write data received over the first bus with write data received over the second bus.

8. The bus bridge and memory controller circuit of claim 7, wherein the buffer circuitry includes a peripheral write buffer for buffering write data received over the second bus.

* * * * *

UNITED STATES PATENT AND TRADEMARK OFFICE
CERTIFICATE OF CORRECTION

PATENT NO.   :   5,630,094

DATED        :   May 13, 1997

INVENTOR(S)  :   Hayek et al.

It is certified that error appears in the above-identified patent and that said Letters Patent is hereby corrected as shown below:

In column 6 at line 7 delete "transitions and insert --transactions--

In column 6 at line 12 delete "memory" and insert --merging--

Signed and Sealed this

Ninth Day of December, 1997

Attest:

BRUCE LEHMAN

Attesting Officer         Commissioner of Patents and Trademarks